United States Patent
Rommeru et al.

[11] Patent Number: 6,135,258
[45] Date of Patent: Oct. 24, 2000

[54] FRICTION LINER WITH CONTROLLED POROSITY, FOR A FRICTION DEVICE WORKING IN LIQUID

[75] Inventors: Cécile Rommeru; Denis Menard, both of Limoges; Philippe Pantier, Ambazac; Loïc Adamczak, Montsecret, all of France

[73] Assignee: Valeo, Paris, France

[21] Appl. No.: 09/035,229

[22] Filed: Mar. 5, 1998

[30] Foreign Application Priority Data

Mar. 6, 1997 [FR] France ................... 97 02780

[51] Int. Cl.$^7$ .............. F16D 69/02; D04H 1/48
[52] U.S. Cl. ................ 192/113.34; 192/3.28; 192/107 M
[58] Field of Search ................ 192/3.28, 3.29, 192/3.3, 66.3, 70.12, 107 M, 113.34, 113.3, 107 R

[56] References Cited

U.S. PATENT DOCUMENTS

| | | | |
|---|---|---|---|
| 4,504,543 | 3/1985 | Yamashita et al. | 192/107 M X |
| 4,700,823 | 10/1987 | Winckler | 192/107 M |
| 4,926,978 | 5/1990 | Shibata et al. | |
| 5,098,758 | 3/1992 | Kani. | |
| 5,456,343 | 10/1995 | Murata et al. | 192/3.29 |
| 5,807,518 | 9/1998 | Menard et al. | |
| 5,865,283 | 2/1999 | Hirayanagi et al. | 192/3.29 |
| 5,890,572 | 4/1999 | Hirayanagi et al. | 192/3.29 |

FOREIGN PATENT DOCUMENTS

| | | |
|---|---|---|
| 202 145 | 11/1986 | European Pat. Off. . |
| 40 18 671 | 12/1990 | Germany . |
| WO 95/26473 | 10/1995 | WIPO . |

*Primary Examiner*—Charles A. Marmor
*Assistant Examiner*—Saúl Rodriguez
*Attorney, Agent, or Firm*—Morgan & Finnegan, LLP

[57] ABSTRACT

A friction liner having a flat, annular general form, for a friction device designed to operate in a liquid medium, consists in particular of a clutch friction wheel or a brake disc, especially for an automatic gearbox or associated with such a gearbox, or a synchronising ring or cone for a manual gearbox. Such friction devices are intended in particular for motor vehicles. The liner is made of a friction material consisting of a mat of fibers impregnated with a thermosetting resin. After a final curing step while the liner is being moulded under pressure, this material has a porous structure with intercommunicating cells. The liner includes zones having different controlled porosities.

4 Claims, 1 Drawing Sheet

# FRICTION LINER WITH CONTROLLED POROSITY, FOR A FRICTION DEVICE WORKING IN LIQUID

FIELD OF THE INVENTION

The present invention relates to friction liners of flat, annular general form, for friction devices intended to work in a liquid medium.

More particularly, the invention relates to a friction liner which is in the form of a flat ring or a frustum of a cone, and the device with which it is equipped is typically a clutch friction wheel (or clutch disc) or a brake disc. Such devices are applicable in particular to automatic gearboxes, or are associated with automatic gearboxes, of the kind which operate in oil; and are also applicable to a synchronising ring or cone of a manual gearbox, again operating in oil. In all cases, such devices are typically installed in motor vehicles.

Most particularly, a friction liner of the kind to which the invention relates is of the type made from a friction material consisting of a mat of fibres impregnated with a thermosetting resin. The method of making such a liner includes a final curing step associated with a moulding operation (which may be moulding of the liner by itself or moulding directly on to a substrate). In the course of this final step, the annular workpiece which is the unfinished friction liner, previously made from the mat of impregnated fibres, is subjected to pressure.

BACKGROUND OF THE INVENTION

The composition and structure of a friction material consisting of a mat of fibres impregnated with a resin of a thermosetting type are described in detail in International patent specification No. WO95/26473. In particular, that document mentions the structural advantages and working advantages of such a type of material as compared with the materials in the state of the art, and particularly with respect to known materials of the "paper" type, which consist essentially of cellulose fibres and which are made using a humid process, by a common method used in paper manufacture, that is to say by processing of a dispersion of short fibres, in particular cellulose fibres, in an aqueous solution containing fillers.

Reference may also be made to the de-ailed contents of the above mentioned International patent specification in the context of working with such a material in order to make a friction liner in accordance with the invention.

This type of unwoven material, which is applicable to a dry process rather than the humid process employed to obtain a paper type material, has the structural advantage that it is porous and has porosities of high magnitude in the range between 50 and 500 micrometers, and that the cells or pores communicate with each other. By contrast, porosities of papers are much smaller, being generally between 5 and 50 micrometers, and their pores are not in communication with each other.

The concept of intercommunicating cells in the porous material is relative, that is to say it has to be considered with reference to the liquid in which the friction liner is immersed, that is to say, in most applications, the oil in a vehicle transmission. In this connection, the oil does not pass through a paper type material, while it does pass through the porous friction material made in accordance with International patent specification No. WO95/26473.

The porosity of this type of material enables oil to circulate within the actual interior of the friction liner, and in particular from its inner periphery to its outer periphery and vice versa, which enables the heat which is produced during operation, by friction of the liner, to be evacuated very effectively. As a result, it also prevents undue heating which could cause degradation of the friction material, or of the oil or the system in general in which the clutch having the liner is incorporated.

Such a beneficial feature is of particular relevance in systems with controlled or continuous sliding.

By contrast, this internal circulation of the oil within the liner may be detrimental in systems such as devices of the so-called "lock-up" type, in which the friction liner must also act as a seal in order to prevent the occurrence of counter-pressures in the lock-up chamber, which would lead to a reduction in the torque transmission capacity of the device concerned.

DISCUSSION OF THE INVENTION

An object of the invention is to provide an improvement in a friction liner which is relevant to a material of the type mentioned above, in order to enable this type of material to be used in different types of system to give effective control of the flow of the liquid.

According to the invention, a friction liner of generally flat, annular form, for a friction device working in a liquid medium, such as, most particularly, a clutch or brake friction disc, especially for an automatic gearbox or associated therewith, or a synchronising ring or cone for a manual gearbox, the liner being of the type made from a friction material consisting of a mat of fibres impregnated with a thermosetting resin which, after a final curing step, has a porous structure with intercommunicating cells, the liner being further of the type in which the method of making the friction liner includes a step of moulding and curing in a mould under pressure, is characterised in that the liner includes zones of different, and controlled, porosities.

In a liner according to the invention, the fact that the porosity of the friction material can be controlled at all points in the liner, or in predetermined zones of the liner, enables the flow of oil inside the liner to be controlled or even suppressed, while preserving the tribological properties of the friction liner.

According to a preferred feature of the invention, the liner includes at least one annular zone the controlled porosity of which is lower than the mean porosity of the body of friction material that constitutes the liner.

Preferably in that case, the said annular zone of lower controlled porosity comprises a peripheral chamfer formed in either the inner or outer peripheral edge of the liner.

According to another preferred feature of the invention, the liner includes a concentric annular insert, having in particular an impermeable structure, the thickness of which is less than the mean thickness of the flat annular liner, and the annular portion, in facing relationship with the said insert, of the material constituting the body of the friction liner, has a controlled porosity which is lower than the mean porosity of the said friction material.

Preferably in such a case, the annular insert is part of a support, for example a metallic support which is part of a clutch friction wheel or brake disc on which the liner is moulded directly.

Preferably, the size of the intercommunicating cells is in the range between 50 and 500 micrometers.

Preferably, the porosity of the friction material is in the range between 20 and 60%.

Further features and advantages of the invention will appear more clearly on a reading of the following description of some preferred embodiments of the invention, which is given by way of non-limiting example only and with reference to the accompanying drawings.

DESCRIPTION OF PREFERRED EMBODIMENTS OF THE INVENTION

Figure 1:
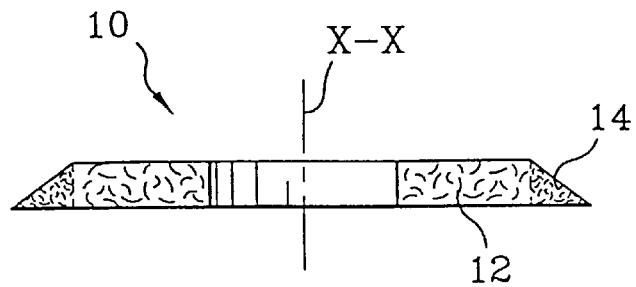
FIG. 1 is a diagrammatic view in diametral cross section of one embodiment of a friction liner according to the invention.

Reference is first made to FIG. 1, which shows a friction liner 10 having the general form of a flat annular ring with an axis X—X.

In the known design mentioned above, the body 12 of the liner 10 is of generally annular form, and is made of a friction material consisting of a mat of fibres impregnated with thermosetting resin. The method of making such a liner includes a final step of curing and moulding the friction liner 10 itself, or of moulding the friction liner on a support (which is not shown in the drawing), with curing of the liner at the same time, so as to form directly a friction disc such as for example a clutch friction wheel or a brake disc.

In the design according to the current state of the art, the friction liner 10 is of homogeneous constitution, that is to say its mean porosity is substantially constant regardless of which zone of the liner is considered.

By contrast, in accordance with the present invention it is arranged that the porosity of the liner is controlled precisely, and that in particular, it can include at least one annular zone the porosity of which is lower than the mean porosity of the material of which the body 12 is made. The density in this annular zone of lower porosity is greater than the mean density of the body 12.

Thus in the example shown in FIG. 1, the liner 10 includes an outer peripheral zone of very high density and with a reduced porosity, which is zero in practice. This outer zone is in the form of a peripheral chamfer 14. The chamfer is made during the final operation of moulding the liner by itself, or moulding it directly on to a disc under pressure with curing, that is to say the workpiece consisting of the annular liner is put into a mould of complementary form, after which the moulding operation is itself carried out by application of axial pressure and heat for the purpose of curing. This leads to an increase in density, and therefore a substantial localised reduction in porosity, in the peripheral chamfered annular zone 14.

This liner may in particular be used in the case of a lock-up system, in which the liner acts as a seal.

It is of course possible to provide various concentric annular zones having different porosities, in the same annular liner. For this purpose, each annular zone may be made in accordance with the example illustrated in FIGS. 2 and 3.

Figure 2:
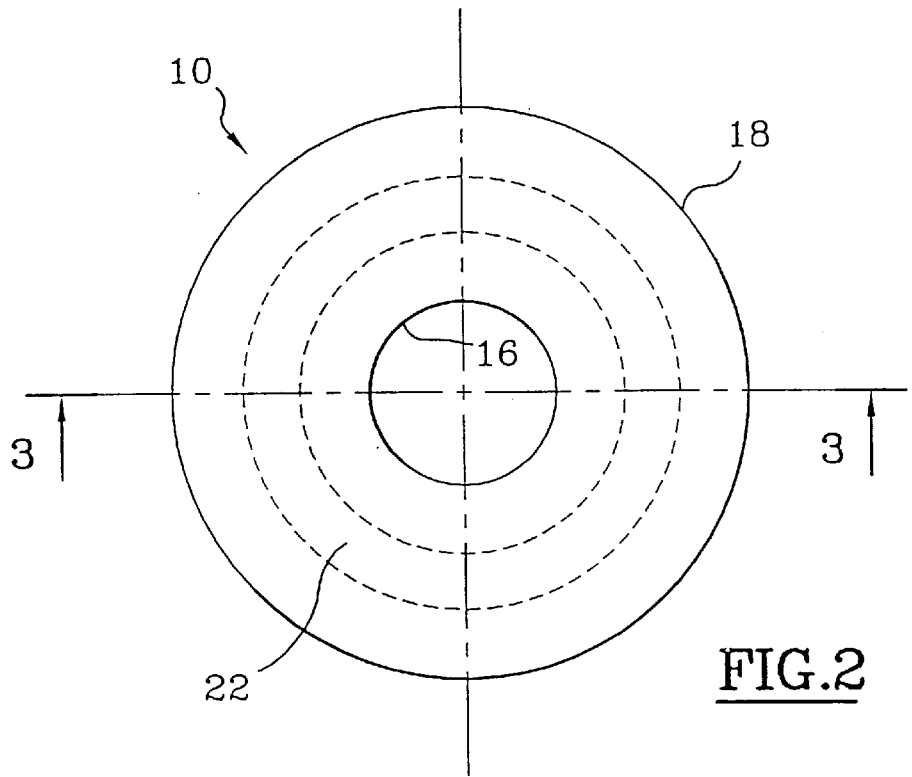
FIG. 2 is a diagrammatic front view showing another embodiment of a friction liner according to the invention.
Figure 3:
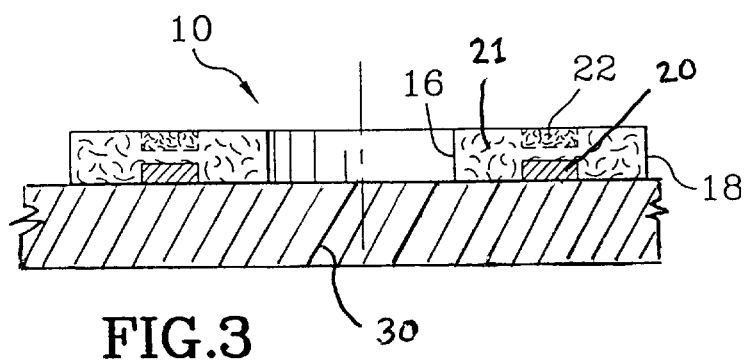
FIG. 3 is a half view in diametral cross section taken on the line 3—3 in FIG. 2.

With reference therefore to FIGS. 2 and 3, the annular liner 10 is of flat, annular form and bounded by two cylindrical surfaces, namely an inner surface 16 and an outer surface 18. The liner 10 includes an annular insert 20 in the form of an annular ring which is introduced into the body 12 of the workpiece, i.e. the liner in the course of manufacture, during the moulding step.

The structure of the material of the insert 20 is such that it is impermeable to, for example, oil, and its presence during the operation of moulding and curing causes a zone 22 to be formed in the body 12 of the liner. This zone 22 lies generally at the same radius as the insert 20, and its density is increased due to the effect of the axial pressure exerted in the mould. Accordingly, the porosity of the high density zone 22 is generally smaller than that of the base material 12, and can even be zero if it is desired to use the liner for sealing purposes.

In FIGS. 2 and 3, the insert 20 is made in the form of an independent element. However, it can of course, with some advantage, be replaced by an annular rib formed in relief on the face of a metallic support 30 in the form of a disc, on which the liner 10 is directly moulded, thereby making a clutch friction wheel in a single step.

Advantageously, the liners of porous friction material, with controlled porosity, enable the porosity of the friction material to be varied as a function of the axial pressure which is applied to it in operation, that is to say its porosity varies inversely in proportion to the value of the axial force applied to the liner.

It will be noted that such a feature is impossible in the case of materials of the paper type, because oil does not flow within the material.

What is claimed is:

1. A friction liner for working in a liquid medium and having a porous structure with intercommunicating cells, the liner having been obtained by moulding and curing, in a mould under pressure, a body consisting of a friction material comprising a mat of fibres impregnated with a thermosetting resin, the friction material having the porous structure in the moulded and cured liner, wherein the liner includes zones of different, controlled, porosities and a concentric annular insert of substantially impermeable material having a thickness smaller than the mean thickness of the liner, the liner comprising a body of said friction material, said body including an annular portion generally at the same radius as the insert, the annular portion having a controlled porosity which is lower than the mean porosity of the friction material.

2. A friction device comprising a metallic support carrying a friction liner according to claim 1, the insert being part of the support, the friction material of the liner being moulded directly on the support.

3. A liner according to claim 1, wherein the intercommunicating cells have a pore size in the range between 50 and 500 micrometers.

4. A liner according to claim 1, wherein the porosity of the friction material is in the range between 20 and 60%.

* * * * *